Jan. 15, 1963 E. L. BARCUS 3,073,921
DIRECTION SIGNAL MECHANISM
Filed Oct. 3, 1958 2 Sheets-Sheet 1

INVENTOR.
Edward L. Barcus
BY John W. Lovett
ATTORNEY

Jan. 15, 1963 E. L BARCUS 3,073,921
DIRECTION SIGNAL MECHANISM
Filed Oct. 3, 1958 2 Sheets-Sheet 2

INVENTOR.
Edward L. Barcus
BY John W. Lovett
ATTORNEY

United States Patent Office 3,073,921
Patented Jan. 15, 1963

3,073,921
DIRECTION SIGNAL MECHANISM
Edward L. Barcus, Anderson, Ind., assignor to General Motors Corporation, Detroit, Mich., a corporation of Delaware
Filed Oct. 3, 1958, Ser. No. 765,091
5 Claims. (Cl. 200—61.34)

This invention relates generally to direction signal mechanisms for vehicles and more particularly to certain improvements in signal switch operating mechanisms of the type which are manually set and automatically reset.

One object of the invention is to provide a mechanism of this type having automatic reset or cancelling means which may be overridden if the mechanism becomes obstructed or is manually restrained against return to the neutral position.

Another object is to provide a signal switch operating mechanism having an improved construction and mounting of the reset pawls which are engageable by a cancelling cam carried by the steering wheel when the mechanism is manually adjusted from a neutral position to different signal operating positions.

A further object is to provide a signal switch operating mechanism which is simple in construction and comprised of parts which may be readily assembled and installed.

These and other objects and the advantages of the present invention will be apparent from the following description of the embodiment shown in the accompanying drawings.

Figure 1:
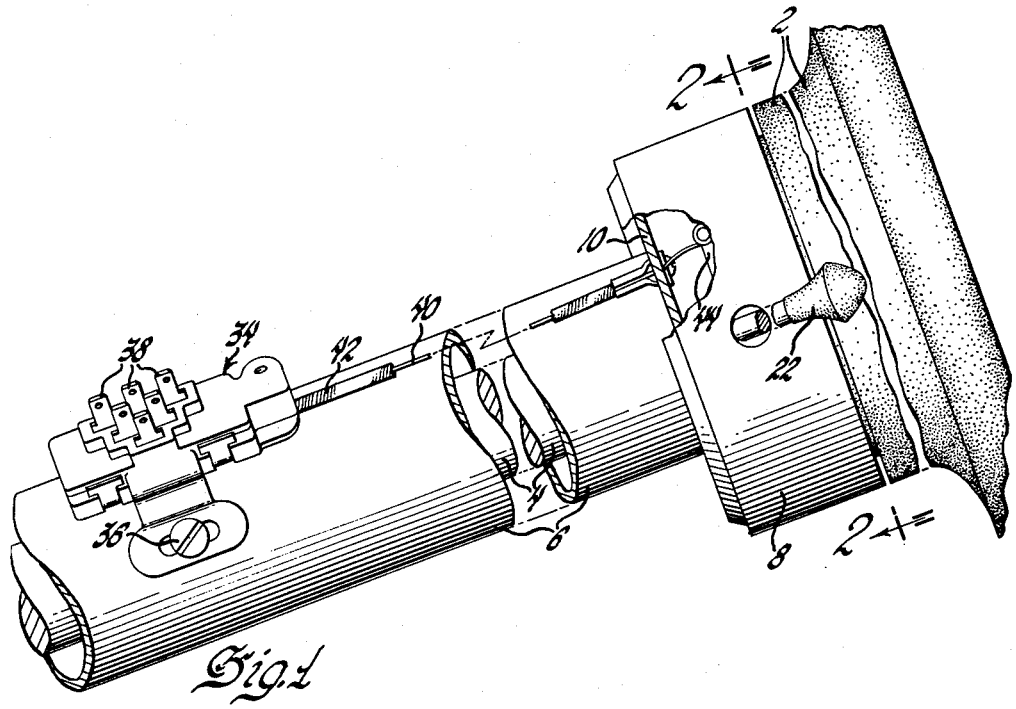
FIG. 1 is a fragmentary side elevation of a vehicle steering column assembly with parts broken away.
Figure 3:
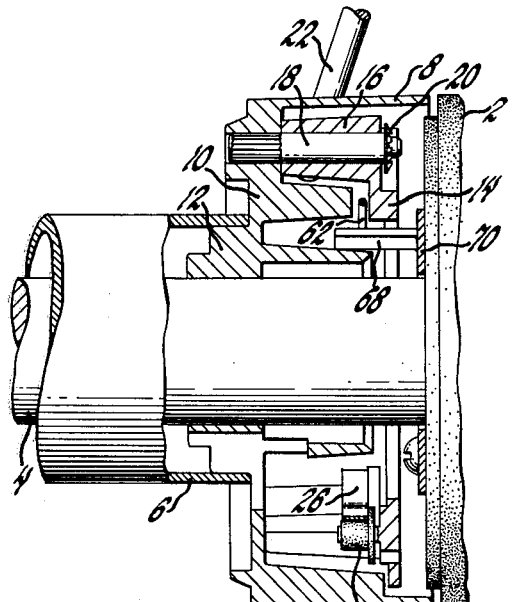
FIG. 3 is a fragmentary view with parts in section taken substantially on line 3—3 of FIG. 2.
Figure 4:
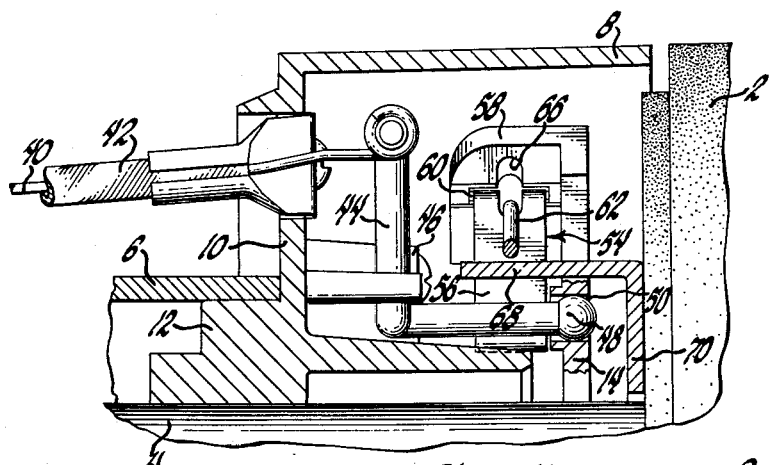
FIG. 4 is an enlarged fragmentary view taken substantially on line 4—4 of FIG. 2.

Referring now to the drawings and particularly to FIG. 1 showing a portion of a vehicle steering column assembly, the steering wheel 2 is secured at the upper end of the usual steering shaft 4 which extends through a steering column 6. A generally cylindrical housing 8 for the signal switch operating mechanism is disposed adjacent the upper end of the steering column 6 with the base 10 of this housing provided with a downwardly extending pilot portion 12 which is slidably received in the upper end of column 6 as shown in FIGS. 3 and 4 and secured therein against rotation by keying or other suitable means.

An operating ring 14 is concentrically disposed within the housing 8 and formed at one side thereof with an integral extending hub portion 16 through which extends a pivot stud 18 secured to the base 10 of the housing to provide a pivotal support for the ring 14 in the housing. The ring 14 may be retained on stud 18 by any suitable means such as a resilient locking washer 20. An operating lever or handle 22 is connected to ring 14 adjacent stud 18 and extends outwardly through an enlarged aperture in the cylindrical wall of housing 8 to permit manual adjustment of the ring 14 to its various positions.

At a location generally opposite the pivot stud 18, the ring 14 is provided with a depending nylon detent roller 24 which is adapted for rolling engagement with a transversely extending blade spring 26 having an undulating midportion defining a central neutral position and switch operating positions at either side of the neutral position. The opposite ends of spring 26 are provided with semi-closed loops which engage around bosses 28 formed on inwardly extending portions of the cylindrical wall of housing 8. The extent of pivotal movement of ring 14 on stud 18 is limited by the engagement of an outward projection 30 on the ring 14 with spaced lugs or stops 32 extending inwardly from the cylindrical wall of housing 8 and it will be apparent that the undulating midportion of spring 26 will flex inwardly responsive to swinging movement of ring 14 in either direction and return flexibly outwardly to yieldably retain the ring in any of its positions.

It will be understood by those skilled in the art that the operating ring 14 is adapted to be associated with an electrical switch to actuate the switch and cause the direction signal lamps to be energized and deenergized in accordance with the position of the operating ring. Although the electrical switch may, if desired, be located in close proximity to the ring and actuated by a depending stud on the ring as shown in my United States Patent 2,848,573, dated August 19, 1958, the electrical switch is preferably disposed exteriorly on the steering column 6 at a considerable distance from the operating mechanism in the housing 8 and actuated by a motion translating member extending from the switch to the operating mechanism as shown generally in copending United States application Serial No. 534,353, William E. Brown et al., entitled Direction Signal, filed September 14, 1955, which has become Patent 2,863,013, dated December 2, 1958.

The electrical switch 34, which has been shown herein as secured to the steering column 6 by screws such as 36, is of the type commonly used in direction signal systems. It will be understood that the switch is provided with a movable bridging member adapted to engage fixed contacts which are so disposed as to complete the desired circuit connections in the direction signal system in accordance with the position to which the bridging member is actuated by the operating ring 14. The fixed contacts have terminals such as shown at 38 for connection to the lead wires in the system and the bridging member in the switch is adapted to be connected to one end of the wire 40 of a flexible cable assembly which extends from the switch to the operating mechanism in housing 8.

Figure 2:
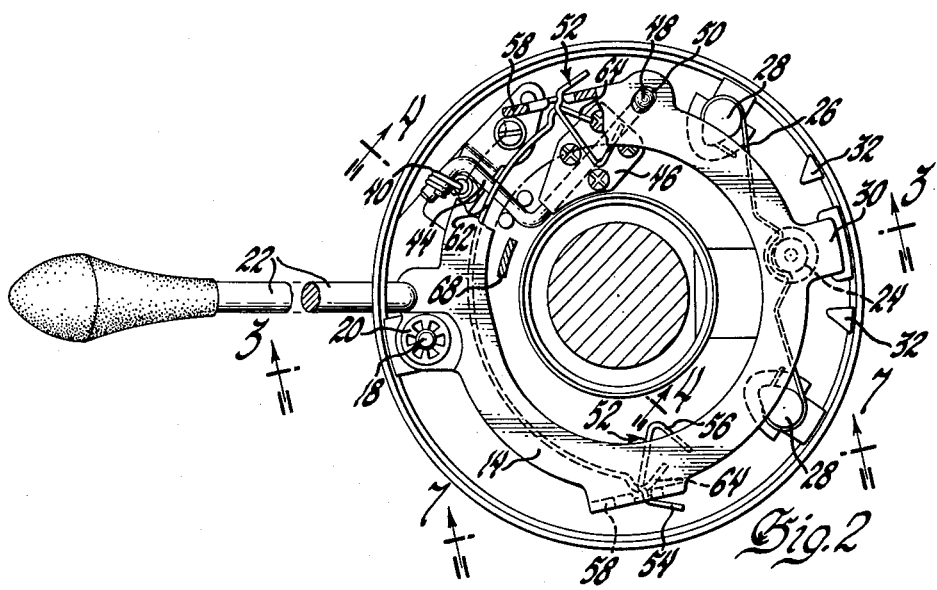
FIG. 2 is an enlarged view of the operating mechanism taken substantially on the line 2—2 of FIG. 1.

The wire 40 is slidable within the usual flexible sheath 42 which is clamped at its upper end within an opening in the base 10 of housing 8 with the wire extending into the housing and connected as shown in FIGS. 2 and 4 to one arm of a bell crank member 44. The intermediate portion of the member 44 is journaled in a boss in housing 8 and retained therein by a plate 46 with the other arm of member 44 extending upwardly and formed with a ball-shaped end 48 which is received within a slot 50 in the ring 14. It will be apparent that pivotal movement or swinging of the ring 14 on stud 18 will rock the bell crank member 44 to cause axial movement of the wire 40 to thereby actuate the bridging member of switch 34 and this operating connection of the ring 14 to the switch 34 is so constructed and arranged that the limited movement of the ring to its various positions will cause a corresponding linear movement of the bridging member of the switch within a limited range to circuit control positions corresponding to the positions of the ring.

In order to provide automatic resetting of the ring 14 to neutral position from either of its direction signal operating positions, in accordance with the present invention, a pair of similarly formed pawls, indicated generally at 52, are mounted on ring 14. The pawls 52 are formed of sheet metal and generally C-shaped as shown in the drawings with a relatively flat base portion 54 and a narrower lobe portion 56 which extends inwardly from the base portion 54 towards the steering shaft 4 when the pawls are mounted on the ring 14 as will be now described.

The ring 14 is provided with depending flanges or ears 58 at substantially opposite points on the ring as shown in FIG. 2. The ears 58 are similarly constructed and each provided with a slot 60 of sufficient length to permit the insertion of the narrower lobe portion 56 of a pawl 52 through this slot from the outer side of the ear. The pawls 52 are adapted to be yieldingly held in the relative positions shown in FIG. 2 with the edges of the base portion 54 which extend beyond the ends of the slot 60 in engagement with the outer sides of ears 58 by means of an arcuate wire spring 62 which is expanded when installed by engaging its bent ends 64 within openings in the pawls to exert an inward pressure thereon. The openings in the pawls 52 for the bent ends 64 of spring 62 are located close to the junction of lobe portion 56 with the base portion 54 and slots 66 are provided in ears 58 to permit outward radial movement of the bent ends of the spring.

The lobe portions 56 of the pawls 52 extend inwardly a short distance beyond the inner periphery of ring 14 to cooperate with a depending arm 68 on plate 70 which is secured to the base of the steering wheel 2 and functions as a rotatable cancelling cam to normally return the ring 14 to neutral position after manual adjustment thereof to one of its signal operating positions. When the ring 14 is in the neutral position shown in FIG. 2 the pawls 52 lie outside the path of movement of the cam 68. When, however, the ring 14 is manually set in one of its signal operating positons, the ring 14 is shifted arcuately about stud 16 to place the lobe portion 56 of one of the pawls in the circular orbit of the cam 68 as shown in FIGS. 5 and 6 for the left turn signal position.

Figures 5, 6:
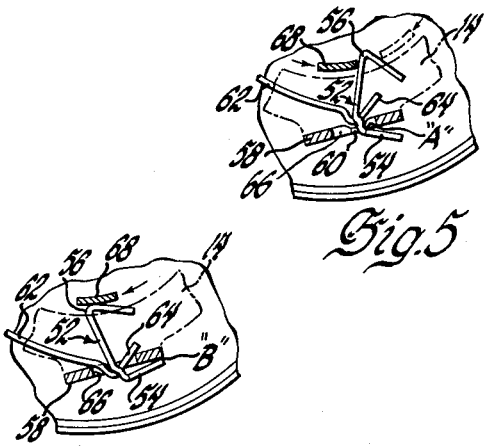
FIG. 5 is a fragmentary view of a portion of the mechanism showing one of the reset pawls and adjacent parts.
FIG. 6 is a view similar to FIG. 5 showing the same parts in a different position.
Figure 7:
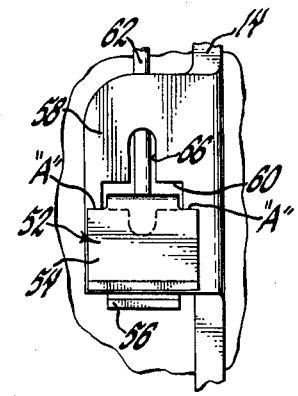
FIG. 7 is an enlarged fragmentary view of the pawl mounting taken substantially on the line 7—7 of FIG. 2.

Referring first to FIG. 5 to describe the normal operation of the pawl 52 when the handle 22 and ring 14 have been adjusted to cause actuation of the switch to signal a left turn, the cam 68 will engage the left side of lobe portion 56, as shown in full lines when the steering wheel 2 is rotated in the direction of the signaled turn or counterclockwise. The pawl 52 will then be rotated clockwise about the point of engagement of the base portion 54 with the ear 58 which is indicated at "A" in FIG. 5 (see also FIG. 7) and forced out of the path of cam 68 as it moves past the pawl. The resistance of the spring 62 to this clockwise rotation of the pawl will be very slight since there will be practically no radial movement of the end of the spring during rotation of the pawl about point "A" but the spring pressure will be sufficient to return the pawl to the position shown in FIG. 5 after passage of the cam 68. Upon reversal of rotation of the steering wheel 2 to return the vehicle to the straight ahead position, the cam 68 will approach and engage the lobe portion 56 of pawl 52 from the right side thereof as shown in dot and dash lines in FIG. 5 and rotate the pawl counterclockwise about the point "A" against the slight resistance of spring 62 until the base portion 54 of the pawl contacts the outer flat face of ear 58 whereupon the continued movement of cam 68 in a counterclockwise direction will move the ring 14 to its neutral position.

In the event the handle 22 is forcibly retained against the normal cancelling or reset action or the switch or operating connections from the ring 14 to the switch are obstructed to prevent return of the ring to its neutral position, the construction and mounting of the pawls is such as to permit overriding of a normal cancelling action without damage to the mechanism. During normal operation the pawl 52 which extends into the path of cam 68 rotates or pivots about the point "A" as described above but if there is any abnormal resistance to return of ring 14 to its neutral position as the cam 68 is moving clockwise as shown in FIG. 6 the pawl 52 will be forced outwardly and rotate or pivot about the point indicated at "B" to permit the cam 68 to move past the lobe 56 of the pawl. This pivotal movement of the pawl 52 about the point "B" is strongly resisted by spring 62 since the bent end 64 of the spring must be moved radially outward during such pivotal movement as shown in FIG. 6. It will be understood that to accomplish the normal cancelling action described heretofore in connection with the showing in FIG. 5 the inward pressure which is exerted by spring 62 on pawl 52 should be sufficient to prevent pivotal movement of the pawl about point "B" unless there is abnormal resistance to the return of ring 14 to its neutral position.

The operation of the present mechanism to provide by-passing, automatic resetting and overriding has been described by reference to FIGS. 5 and 6 when the handle and operating ring have been manually moved to the position to signal a left turn and place the lobe portion 56 of one of the pawls in the circular orbit of cam 68. To those skilled in the art it will be apparent that when the handle and operating ring are moved to the right turn signal position the lobe portion 56 of the other pawl will be in the path of cam 68 and the operation will be the same as described above except in the reverse sense.

While the embodiment of the present invention disclosed herein constitutes a preferred form, it is to be understood that various changes and modifications may be made therein and are contemplated within the scope of the following claims.

I claim:

1. In a direction signal switch operating mechanism, a housing, a ring pivotally mounted in said housing for movement from a neutral position to operating positions at opposite sides of said neutral position, rotatable cam means, a pair of pawls having lobe portions adapted to be selectively positioned in the path of said cam means upon movement of said ring to one of its operating positions and base portions adapted to pivotally engage said ring, and means for mounting said pawls on said ring at opposite sides of the pivot thereof including spaced ears on said ring provided with slots through which the lobe portions of said pawls extend and a spring extending between said pawls to urge said pawls in a direction to yieldably fasten said lobe portions in said slots with said base portions in engagement with said ears.

2. In a direction signal switch operating mechanism, a housing, a ring pivotally mounted in said housing for movement from a neutral position to operating positions at opposite sides of said neutral position, rotatable cam means, a pair of pawls mounted on said ring at opposite sides of the pivot thereof, each of said pawls having a lobe portion and a base portion with the lobe portion extending inwardly toward the axis of said rotatable cam means, the lobe portion of one of said pawls being adapted to project into the path of said cam means when said ring is in one of its operating positions and the lobe portion of the other pawl being adapted to project into the path of said cam means when said ring is in its other operating position, said pawls being mounted on ears on said ring which ears are provided with slots through which the lobe portions of said pawls extend with the base portions of said pawls in engagement with the outer sides of said ears, and spring means yieldably fastening said pawls on said ears to allow pivotal movement of said pawls about different points of engagement of said base portions with said ears.

3. In a directional signal switch operating mechanism, a housing, a ring pivotally mounted in said housing for movement from a neutral position to operating positions on opposite sides of said neutral position, rotatable cam means, a pair of pawls having lobe portions adapted to be selectively positioned in the path of said cam means upon movement of said ring to one of its operating positions and adapted to be engaged by said cam means to move said ring to said neutral position and base portions adapted to pivotally engage said ring, an arcuate spring for pivotally fastening said pawls to said ring, each pawl having a spring receiving aperture in the lobe portion near the said base, a bent end portion of said spring extending through said aperture, a first pivot point at the juncture of the lobe and base, and a second pivot point at the free end of the base, thereby allowing pivotal movement of each pawl relative to its corresponding ear about the first pivotal position for normal operation and about the scond pivot point when abnormal resistance is encountered to the movement of said ring to neutral position.

4. In a direction signal switching operating mechanism, a housing, a ring pivotally mounted in said housing for movement from a neutral position to operating positions on opposite sides of said neutral position, rotatable cam means, a pair of pawls having lobe portions adapted to be selectively positioned in the path of said cam means upon movement of said ring to one of its operating positions and adapted to be engaged by said cam means to move said ring to said neutral position and base portions adapted to pivotally engage said ring, spring means for pivotally fastening said pawls to said ring, each pawl having a spring receiving aperture in the lobe portion near the said base, a bent end portion of said spring means extending through said aperture, a first pivot point at the juncture of the lobe and base, and a second pivot point at the free end of the base, the pivot points being so arranged relative to the said spring means that a light spring tension resists movement about the first pivot point and a relatively strong spring tension resists movement about the second pivot point.

5. In a direction signal switch operating mechanism, a housing, a ring pivotally mounted in said housing for movement from a neutral position to operating positions at opposite sides of said neutral position, rotatable cam means, a pair of pawls adapted to be selectively positioned in the path of said cam means upon movement of said ring to one of its operating positions, and a spring extending between the pawls and having an articulate connection with each pawl to provide the sole means of yieldably fastening each pawl directly to said ring for independent pivotal movement thereon.

References Cited in the file of this patent

UNITED STATES PATENTS

| | | |
|---|---|---|
| 2,724,750 | Brown | Nov. 22, 1955 |
| 2,725,435 | Cislo | Nov. 29, 1955 |
| 2,733,309 | Elliott | Jan. 31, 1956 |
| 2,757,250 | Brown et al. | July 31, 1956 |
| 2,800,541 | Brown et al. | July 23, 1957 |
| 2,815,412 | Spicer | Dec. 3, 1957 |
| 2,863,013 | Brown et al. | Dec. 2, 1958 |